Sept. 19, 1950 W. SCHAELCHLIN 2,523,148
PHASE BALANCE PROTECTIVE RELAY SYSTEM
Filed May 7, 1945 2 Sheets-Sheet 1

WITNESSES:

INVENTOR
Walter Schaelchlin.
BY
Paul E. Friedemann
ATTORNEY

Sept. 19, 1950 W. SCHAELCHLIN 2,523,148
PHASE BALANCE PROTECTIVE RELAY SYSTEM
Filed May 7, 1945 2 Sheets-Sheet 2

WITNESSES:

INVENTOR
Walter Schaelchlin.
BY
Paul E. Friedemann
ATTORNEY

Patented Sept. 19, 1950

2,523,148

UNITED STATES PATENT OFFICE 2,523,148

PHASE BALANCE PROTECTIVE RELAY SYSTEM

Walter Schaelchlin, Pittsburgh, Pa., assignor to Westinghouse Electric Corporation, a corporation of Pennsylvania Application May 7, 1945, Serial No. 592,403

6 Claims. (Cl. 175—294)

My invention relates to phase balance relays applicable, especially for protective purposes, in polyphase alternating-current systems such as the variable frequency systems of electric ship propulsion plants.

Relays of this type are designed to trip instantaneously upon occurrence of a partial or complete unbalance in the different phases of the line. To accomplish this, the phase currents or voltages are balanced against one another so that under normal conditions the resultant relay torque is zero, while any excessive unbalance, for instance, due to failure in one of the phases, disturbs the relay balance and hence causes it to trip thereby initiating a protective switching operation.

In the customary relays of this general type, the relay balance is obtained mechanically by means of several magnets or torque elements working against each other. These known devices are complicated and have many movable parts which render it difficult to secure a reliable operation under severe conditions as existing for instance during periods of strong vibration, shock or heavy surges of current.

It is an object of my invention to devise an improved phase balance relay which combines simplified mechanical construction with improved reliability under abnormal load conditions and lends itself readily to being designed in a shockproof manner.

Another object of the invention is to provide a phase balance relay which affords a rapid tripping operation and high sensitivity within the entire available range of frequencies. It is further aimed by this invention at providing a relay apparatus which combines the relay proper and all necessary circuit elements within a single compact unit readily attachable to the line and to the circuit to be controlled.

According to one of the essential features of my invention, the balance within the phase balance relay is produced electromagnetically by means of a plurality of energizing coils which are inductively associated with a common magnetic circuit so as to produce a resultant zero magnetization when the polyphase line operates under balanced conditions. According to another feature of the invention, the coils are arranged in pairs of mutually balanceable coil units and located on the two limbs of a substantially U-shaped magnet structure. According to still another feature, the coils of the relay are energized by means of a plurality of respective rectifier circuits which are primarily connected across the phases of the line and contain amplitude-limiting devices so that the coil energization depends on the voltage balance of the line but remains approximately constant for changes of line voltage and frequency within the available range of normal voltage regulation.

These and other objects and features of the invention will be apparent from the drawings, in which.

Figure 1:
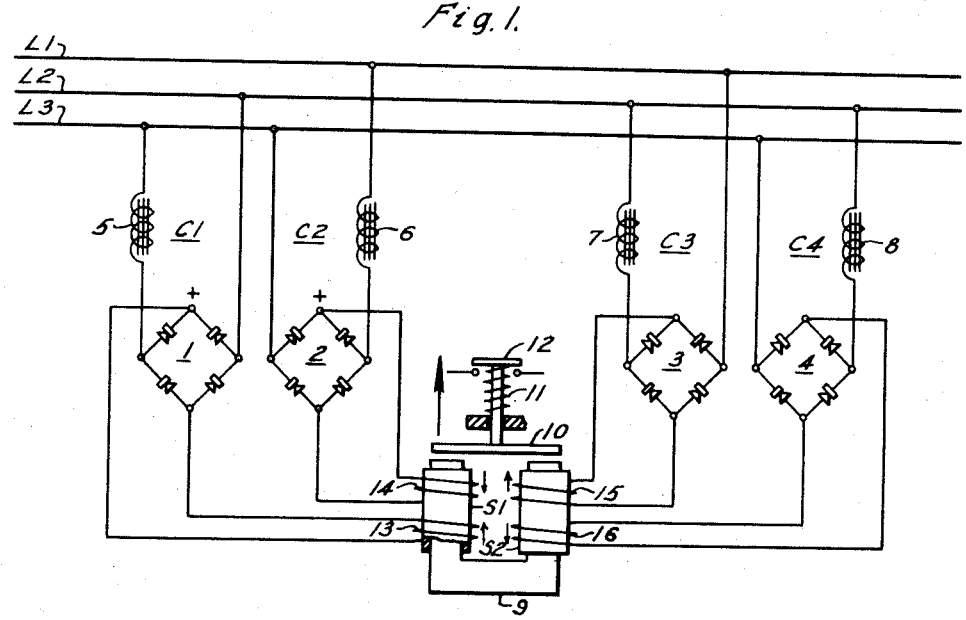
Figure 1 is the circuit diagram of a control apparatus for actuating a contact in response to the occurrence of an excessive unbalance between the phase voltages of a polyphase current line.

Referring to Fig. 1, the three buses of an alternating-current line, in particular of a variable-voltage ship-propulsion plant are denoted by $L_1$, $L_2$ and $L_3$. Four circuits, $C_1$, $C_2$, $C_3$ and $C_4$, are attached between the individual phases of the line so that circuits $C_1$ and $C_4$ are energized by the phase voltage between buses $L_2$ and $L_3$, while circuit $C_2$ is impressed by the phase voltage between buses $L_1$ and $L_3$ and circuit $C_3$ by the phase voltage between buses $L_1$ and $L_2$. Each of the four circuits is provided with a full-wave rectifier 1, 2, 3 and 4, respectively, and contains also a reactor 5, 6, 7 and 8, respectively, arranged in series with the input terminals of the respective rectifiers.

An electromagnetic contactor to be controlled by the rectifier output voltages of the four circuits has a magnetic circuit composed of a substantially U-shaped field structure 9 and a movable armature 10. The armature is normally biased toward the illustrated open position by means of a spring 11 and controls the operation of contact means which in Fig. 1 are schematically represented by a contact 12. Each of the two parallel limbs of the field structure 9 is inductively associated with a pair of magnetizing coils denoted by 13, 14 and 15, 16, respectively.

The four coils are connected across the output terminals of the four rectifiers respectively. The two coils of each pair are connected so as to balance each other when the respective phase voltages are substantially balanced. Consequently, the resultant magnetization of the field structure 9 is substantially zero under normal balance conditions of the alternating-current line.

The four reactors 5, 6, 7 and 8 act as amplitude limiting devices. They operate substantially on the straight portion of their magnetic characteristic and maintain the rectified current which traverses the relay coils approximately constant over the whole frequency range of the alternating-current in order to secure a substantially uniform tripping sensitivity of the relay.

Figure 2:
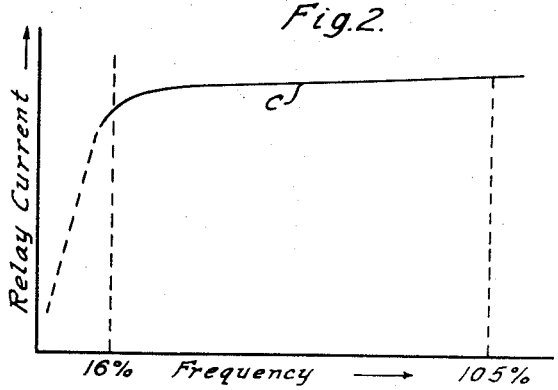
Figs. 2 and 3 are explanatory and show a current frequency characteristic and a voltage vector diagram illustrative of conditions obtaining in the apparatus of Fig. 1 in the case of a short circuit between two phases.

Fig. 2 illustrates a typical relay current curve $C$ as a function of frequency for constant volts per cycle. Between the available limits of voltage or speed regulation of the propulsion system, between about 16% to 105% normal frequency, the current in each coil changes only to a negligible extent.

Figure 3:
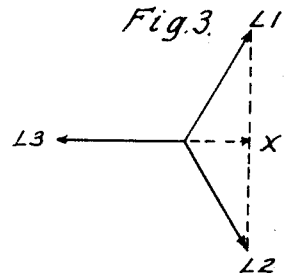

Due to the arrangement of the coils in balanced pairs, the relay will trip regardless of the particular phase in which an unbalance occurs. If the relay is to operate only in the case of severe faults or short circuits, it may be calibrated to trip at an unbalance of, for instance, 40% at any point of the frequency or speed range. Such an unbalance may occur due to a fault inside the machines or due to a flashover in the bus structure. In the case of a complete short circuit across the phase $L_1$—$L_2$, for instance, the voltage across $L_3$—$L_1$ and $L_3$—$L_2$ decreases to the value $L_3$—$X$ as shown in the vector diagram of Fig. 3. This decrease amounts to 86% and hence will safely cause an immediate response to the relay which by its switching operation controls a protective action, for instance the opening of a circuit breaker, in order to interrupt the load current before further damage can be done to the plant.

It is desirable to provide a copper tube damper winding around the field structure 9 of the relay in order to smooth out the ripple of the rectified direct-current which might possibly interfere to a certain extent with the positive and sensitive operation of the apparatus. Such copper tube windings are shown in Fig. 1 and are denoted by S1 and S2.

Figure 4:
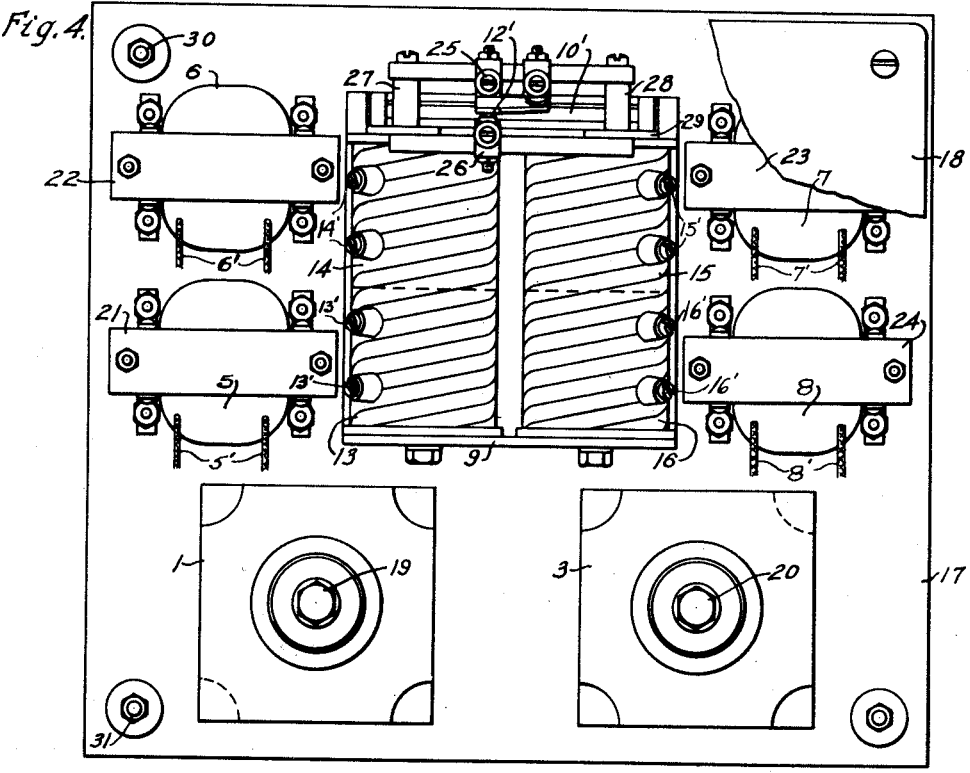
Fig. 4 is a front view of an apparatus corresponding to the circuit diagram of Fig. 1.
Figure 5:
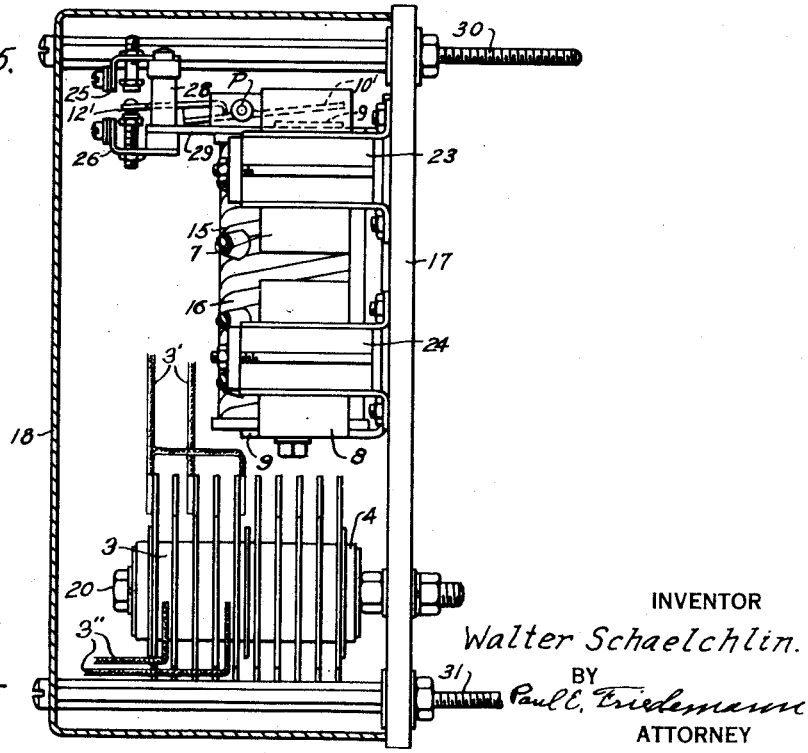
Fig. 5 is a side view of the same apparatus as shown in Fig. 4.

Referring to Figs. 4 and 5, numeral 17 represents a base plate. The individual parts of the apparatus are placed on the front face of plate 17 and are covered by a removable cover 18. The rectifiers 1 and 2 are mounted together and secured to the base plate 17 by means of a fastening bolt 19. The two rectifiers 3 and 4 are similarly attached to the base plate by means of a bolt 20. The terminals of rectifier 3 are denoted by 3' and 3''; those of the other rectifiers are similar and not shown. The four reactors 5, 6, 7 and 8 are fastened to plate 17 by means of individual brackets denoted by 21, 22, 23 and 24 respectively. The reactor terminals are denoted by 5', 6', 7' and 8', respectively. The field structure 9 with its coils 13, 14, 15 and 16 is attached to the base plate 17 so that it lies in the center space between the reactors. The coil terminals are at 13', 14', 15' and 16', respectively.

The armature of the relay in Figs. 4 and 5 is denoted by 10' and the appertaining movable contact by 12'. The armature assembly is mounted for pivotal motion about a pivot pin P. The assembly as shown in Figs. 4 and 5 is statically and dynamically approximately balanced with respect to the pivot axis, so that the tripping current is substantially independent of the relay position. The balanced design of the armature assembly protects the apparatus effectively from performing uncontrolled switching operations when subjected to vibration or shock. The armature assembly has relatively low weight so that any vibration which may still be caused by impact shock has an extremely small time constant in order to reduce the period of uncontrolled contact separation to a minimum.

Contact 12' of the armature assembly is movable between two stationary contacts which are adjustably mounted on terminals 25 and 26. A spring (not shown) is provided for biasing the contact 12 toward the contact of terminal 26 so that the armature 10' tends to stay away from the pole surface of the field structure 9. Any unbalance occurring between either of the two coil pairs will cause the armature 10' to be attracted by the field structure, thereby separating contact 12' from the lower stationary contact and placing it in engagement with the contact of terminal 25. It will be understood that any other arrangement of make or break contacts can be used depending upon the requirements of the particular circuit to be controlled by the apparatus.

The terminals 25 and 26 and the appertaining stationary contacts are interconnected by spacing members 27 and 28. These members are firmly attached to a support 29 which in turn is secured to the base plate 17. Fastening screws, such as those denoted by 30 and 31, are provided for attaching the base plate 17 to a wall or panel and for holding the cover 18 in proper position.

It should be observed that the operation of the phase balance relay depends on the balance of the phase voltages rather than on the current conditions of the alternating-current line. This has the advantage that the control apparatus is less apt to trip during the occurrence of heavy switching surges or high current peaks which are inevitable during maneuvering or crash stops but do not involve unbalance conditions or faults in the propulsion system. The dependence of the control operation on the voltage balance offers the further advantage that the relay can readily be made to trip instantaneously thereby affording a higher degree of protection in the case of short circuits. A still further advantage lies in the fact that when there are several prime movers and alternators operating in parallel, only one balanced relay need be connected across the common propulsion bus.

Control apparatus according to the invention as exemplified in the foregoing, are further distinguished by an extremely simple and sturdy mechanical design with a minimum of movable parts and a high degree of accuracy. This advantage is achieved by virtue of the fact that the balanced effect is electromagnetic and manifests itself by the disappearance or appearance of a resultant flux in the magnetic circuit of the relay proper.

The mounting together of all essential elements of the apparatus on a common mounting plate and on a common cover results in a single compact unit of small space requirements. The internal wiring is preferably completed in the factory so that the apparatus is installed as a whole by merely connecting the proper terminals with the buses of the alternating-current line and with the circuit breaker or other apparatus to be controlled.

While I have shown a preferred embodiment of my invention, it will be understood by those skilled in the art that the apparatus can be modified as regards the arrangement of its individual parts as well as in other respects within the above disclosed principles and without departure from the essential features of the invention as defined in the claims annexed hereto.

I claim as my invention:

1. Control apparatus for polyphase alternating-current lines, comprising a plurality of polyphase buses, a plurality of electric circuits each connected across two of said buses so that said circuits are energized by respective phase voltages, each of said circuits having amplitude limiting means and rectifier means so as to normally provide, when in operation, a rectified output current whose value is approximately constant for different frequencies of line current, and a relay having control means movable between two positions and biased toward one of said positions and having an electromagnetic circuit for actuating said control means to move into said other position and a plurality of magnetizing coils inductively associated with said magnetic circuit and connected with said rectifier means respectively to be energized by said output current, said coils being rated and connected for balancing one another electromagnetically to induce together substantially zero magnetization in said magnetic circuit when said phases are in balanced load condition so that said control means are actuated only when said phases are unbalanced.

2. Control apparatus for three-phase lines for alternating-current of variable frequency, comprising four voltage-responsive electric circuits two of which have terminal means for connection to one phase of the line while the two other circuits have terminal means for connection of the two other phases respectively, each of said circuits having amplitude limiting means and rectifier means so as to normally provide, when in operation, a rectified output current whose value is approximately constant for different frequencies of line current, and a relay having control means movable between two positions and biased toward one of said positions and having an electromagnetic circuit for actuating said control means to move into said other position, and two pairs of mutually balancing magnetizing coils inductively associated with said magnetic circuit, one coil of each pair being connected to said rectifier means of said first two electric circuits respectively and the remaining two coils being connected to said other rectifier means respectively so that all said coils are energized by said respective output currents, said coils being rated and connected for balancing one another electromagnetically to induce together substantially zero magnetization in said magnetic circuit when said phases are in balanced load condition so that said control means are actuated only when said phases are unbalanced.

3. Control apparatus for three-phase lines for alternating current of variable frequency, comprising four voltage-responsive electric circuits having terminals for connection to said line so that two of said circuits are energized by one of the phase voltages and the other two circuits by the other two phase voltages respectively of the line, each of said circuits having amplitude limiting means and rectifier means so as to normally provide, when in operation, a rectified output current whose value is approximately constant for different frequencies of line current, and a relay having control means movable between two positions and biased toward one of said positions and having an electromagnetic circuit for actuating said control means to move into said other position, and four magnetizing coils inductively associated with said magnetic circuit and connected with said rectifier means respectively to be energized by said output current, said coils being rated and connected for balancing one another electromagnetically to induce together substantially zero magnetization in said magnetic circuit when said phases are in balanced load condition so that said control means are actuated only when said phases are unbalanced.

4. A phase balance relay for a three-phase alternating-current line, comprising an electromagnetic contactor having a movable armature assembly and a magnet structure provided with four coils arranged in two individually balanceable pairs and rated and polarized for producing resultant magnetization of substantially zero value in said structure when said coils receive energization of substantially equal magnitude, four full-wave rectifiers, having direct-current output leads connected to said coils respectively, and circuit means including amplitude-limiting devices and connected to said rectifiers respectively for attaching them to the line so as to energize two of them by the same phase voltage and the two others by the two other phase voltages respectively of the line.

5. A phase balance relay for a three-phase alternating-current line, comprising a supporting base, a contactor mounted on said base and having a movable armature assembly and a stationary magnet with two parallel limbs so as to be substantially U-shaped, two pairs of mutually balanceable magnetizing coils disposed on said respective limbs, four rectifiers secured to said base and secondarily connected to said coils respectively, four saturable reactors secured to said base and series-connected to the primary side of said respective rectifiers, and terminal means also secured to said base for imposing the phase voltages of the line on said rectifiers and reactors so that said coil pairs receive balanced energization under normal conditions and cause said assembly to be actuated only upon occurrence of voltage unbalance in the line.

6. A protective relay circuit for alternating-current ship propulsion systems of variable frequency, comprising polyphase circuit means to conduct the frequency variable alternating current, a plurality of voltage-responsive circuits connected across said circuit means to be energized by the phase voltages of said current, each of said circuits including a current limiting reactor and a rectifier so as to provide a rectified output current whose magnitude is approximately constant within the normal range of frequencies of the propulsion system, a contact relay having an armature assembly movable between two positions and biased toward one of them, said relay having a magnetizable structure for moving said assembly into said other position when sufficiently magnetized, and a plurality of magnetizing coils disposed on said structure and connected to said rectifiers to be energized by said output current, said coils being rated and connected for balancing each other under balanced conditions of said phase voltages so that said structure is magnetized to move said assembly only when said condition becomes unbalanced.

WALTER SCHAELCHLIN.

REFERENCES CITED

The following references are of record in the file of this patent:

UNITED STATES PATENTS

| Number | Name | Date |
|---|---|---|
| 1,461,551 | Macmillan | July 10, 1923 |
| 1,526,027 | Traver | Feb. 10, 1925 |
| 1,637,043 | Jones | July 26, 1927 |
| 1,980,395 | Fitzgerald | Nov. 13, 1934 |
| 2,241,127 | Harder | May 6, 1941 |
| 2,265,039 | Harder | Dec. 2, 1941 |
| 2,343,423 | Reagan | Mar. 7, 1944 |

OTHER REFERENCES

Electrical Review, March 22, 1945, pages 423–424.